Figure 1:
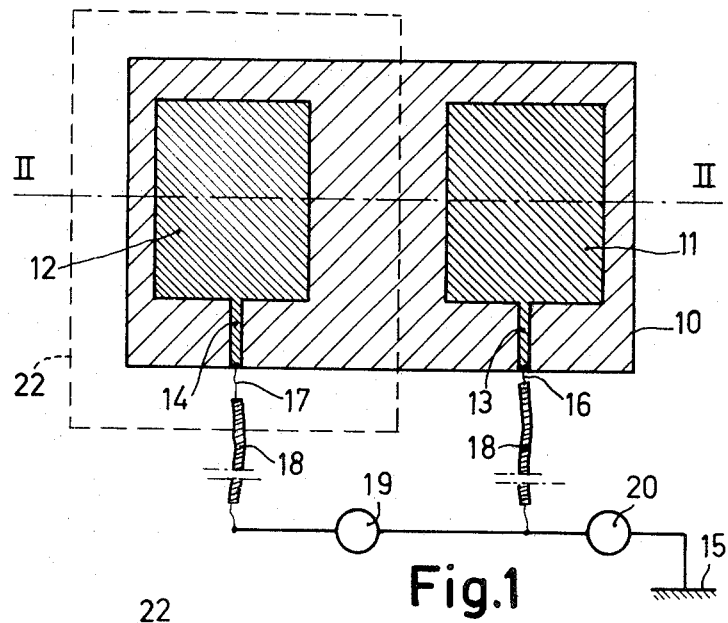

United States Patent [19]

Pompei et al.

[11] 3,775,277

[45] Nov. 27, 1973

[54] METHOD OF DETERMINING THE THICKNESS OF A LAYER OF DIELECTRIC MATERIAL DURING ITS GROWTH

[75] Inventors: Jean Pompei, Evreaux; Yannick Le Vacon, Rueil, both of France

[73] Assignee: U.S. Philips Corporation, New York, N.Y.

[22] Filed: Feb. 7, 1972

[21] Appl. No.: 224,023

[30] Foreign Application Priority Data
May 11, 1971  France .............................. 7116954

[52] U.S. Cl. ................. 204/192, 204/1 T, 324/61 R
[51] Int. Cl. .......................................... C23c 15/00
[58] Field of Search ................... 324/61 R; 204/192, 204/298, 195 R, 1 T; 118/8

[56] References Cited
UNITED STATES PATENTS

| | | |
|---|---|---|
| 3,278,843 | 10/1966 | Deming ............................ 324/61 R |
| 3,493,484 | 2/1970 | Berg et al. ........................ 204/195 R |
| 2,824,281 | 2/1958 | Radnor ............................ 324/61 R |
| 3,350,941 | 11/1967 | Misevich et al. ............... 324/61 R X |
| 3,591,479 | 7/1971 | Stern ................................. 204/192 |
| 3,614,606 | 10/1971 | Schmidt et al. .................. 324/61 R |
| 2,978,364 | 4/1961 | Blaustein ........................... 118/8 X |

*Primary Examiner*—G. L. Kaplan
*Attorney*—Frank R. Trifari

[57] ABSTRACT

A method of and a device for determining the thickness of a thin layer of dielectric material during deposition of this layer by means of cathode sputtering. The thickness of the layer is calculated by means of voltages which are measured by means of a detector which is arranged in the plasma of the discharge.

2 Claims, 8 Drawing Figures

METHOD OF DETERMINING THE THICKNESS OF A LAYER OF DIELECTRIC MATERIAL DURING ITS GROWTH

The invention relates to a method of determining the thickness of a thin layer of dielectric material during deposition, by means of cathode sputtering, of this layer on substrates which are provided on a carrier electrode in a space in which a gas discharge is maintained such that the space is at least partly filled with a plasma.

Different methods are known of measuring the thickness of a thin layer during formation of this layer if this formation is effected by a method other than cathode sputtering, for example, by vapour-deposition in vacuum.

The complex physical and chemical condition of the plasma formed between the electrodes of a cathode sputtering device, particulary in the vicinity of the carrier electrode where the thin layer is formed, and the light phenomena accompanying the discharge, sustantially hamper the observation of the growth of the layer. This observation becomes particularly difficult if the layer to be formed consists of a dielectric material.

According to a known method the thickness of a thin layer of dielectric material is more or less accurately determined, depending on the circumstances, by techniques which are based on light interference: a light beam of known composition is directed onto the substrate on which the layer is formed under a given angle of incidence; the reflected light impinges upon a calibrated detector which registers the light and which indicates the maxima and the minima in the intensity of the reflected light which are produced when the light beams reflected by the substrate and by the surface of the layer formed are joined.

The drawback of a method of this kind when used with cathode sputtering is that it is almost unavoidable that the detector receives and registers the light which is continuously transmitted by the gas discharge.

Moreover, the intensity of this light changes as the properties of the gas discharge change, while the spectral composition of the light also changes in accordance with the nature of the gases present in the sputtering space.

Attempts have been made to eliminate these drawbacks by adding filter devices to the detector which serve to separate the light of the measuring source from the light produced by the discharge, but in spite of their complexity these filter devices are not capable of fully eliminating the drawbacks.

These drawbacks, of course, give rise to measuring errors as regards the layer thickness, and these measuring errors will be larger as the composition of the discharge is more complex.

On the other hand, the measuring method using reflection can be used only for layers having a small thickness, through which the incident light can penetrate down to the surface of the substrate situated underneath.

The invention has for its object to provide a method of continuously, readily and accurately determining, by means of a simple device, the thickness of a thin layer of dielectric material formed by cathode sputtering, independent of the operating conditions required for the formation of this layer.

The invention is based on the recognition of the fact that a potential difference exists between on the one side the lower side of a thin dielectric layer, said lower side being in electrical contact with a carrier electrode of a cathode sputtering device, and the upper surface of said layer facing the plasma of the discharge on the other side, the said potential difference depending on the thickness of the layer under circumstances which otherwise remain the same.

The method according to the invention is characterized in that in the vicinity of the carrier electrode and in a plane which is approximately parallel to the carrier electrode a detector is arranged in the plasma, the detector consisting of an insulating plate comprising two conducting regions, the first region of which is exposed to the cathode sputtering, the second region being shielded therefrom, potential differences being measured between the two conducting regions mutually and between the first region and a reference potential.

The insulating plate and the substrates are preferably made of the same material.

Due to the arrangement of the detector, in which one of the two conducting regions is exposed to the cathode sputtering, this region, i.e. the first region is covered with a thin layer of dielectric material which corresponds to the layer which is deposited on the substrates, while, the second region, which is shielded by the shield, remains uncovered.

The electrical potential of the first region (covered with the layer) varies as a function of the layer thickness, the potential of the uncovered region adopting a given value which is called "floating potential".

The thickness of the thin layer is determined by simultaneously measuring the potential difference between the two conducting regions and the potential difference between the region covered with the layer and a reference potential, the reference potential being, for example, the potential of the carrier electrode which is situated in the vicinity of the detector; the thickness can then be calculated using a simple forumla such as will be described hereinafter with reference to the figures.

Consequently, the measuring method according to the invention is simple and this constitutes the first advantage of the invention.

The second advantage is that using this method accurate measurements can be performed, regardless of the circumstances in which the gas discharge takes place, and regardless of the nature of the gas or of the gas mixture in the sputtering space. In addition, the measurement is independent of the intensity and of the spectral composition of the light of the gas discharge, which is a distinct advantage over the methods commonly used thus far.

A third advantage of the method according to the invention is that it is possible to use a very simple device which can be readily manufactured and which is inexpensive.

According to a first embodiment of a detector required for performing the method according to the invention, the two conducting regions are situated on the same side of the insulating plate. The other side of this plate can then be placed directly on the carrier electrode.

According to a second embodiment of the measuring device, one of the two conducting regions is situated on a side of the insulating plate, the second region being situated on the other side. If the plate is arranged in the vicinity of and approximately parallel to the carrier electrode, the conducting region facing the carrier electrode is shielded from the deposits caused by the cathode sputtering. Consequently, in an embodiment thus constructed it is not necessary to use a separate shield as the insulating plate itself serves as a shield. On the other hand, it is no longer possible to place the plate on the carrier electrode; a separate connection device for the plate is then required.

Figure 2:
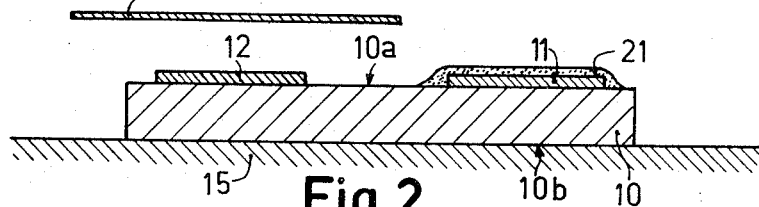
Figure 3:
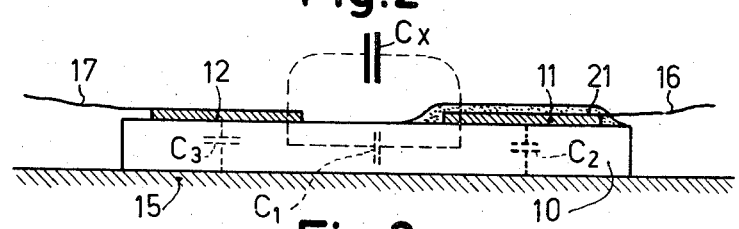
Figure 4:
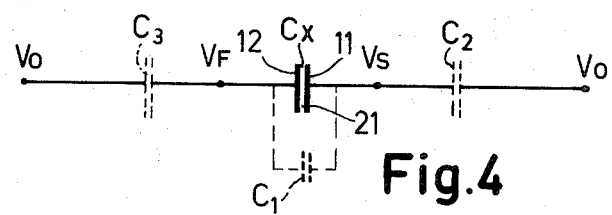
Figure 5:
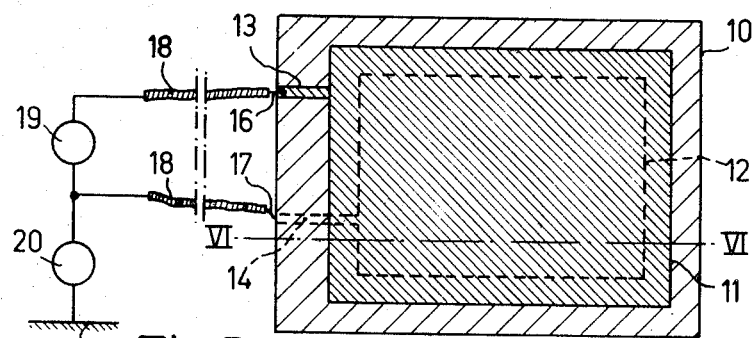
Figure 6:
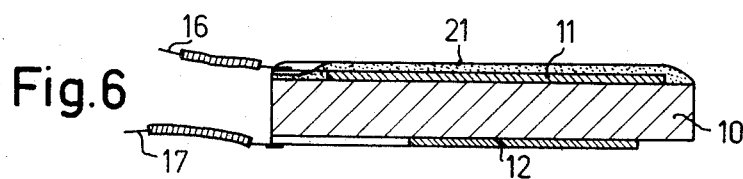
Figure 7:
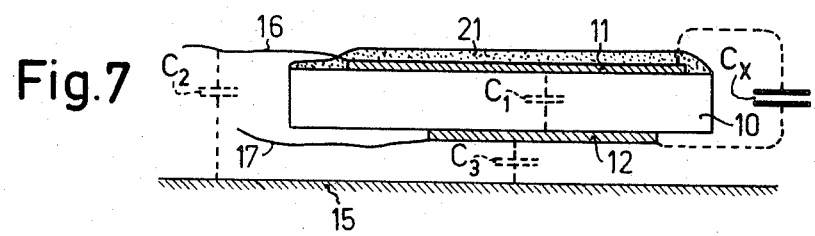
Figure 8:
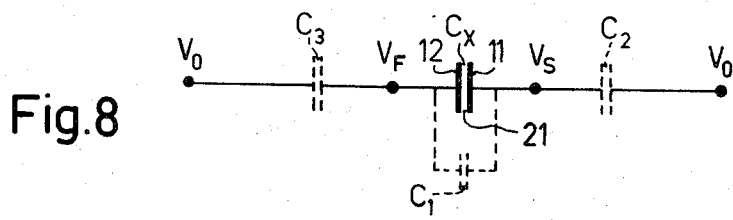

In order that the invention may be readily carried into effect, some embodiments thereof will now be described in detail, by way of example, with reference to the accompanying diagrammatic drawings, in which:

FIG. 1 is a plan view of a first embodiment of a detector for performing the method according to the invention, FIG. 2 is a diagrammatic longitudinal sectional view of the detector shown in FIG. 1, a shield being arranged above this detector, FIG. 3 is a view of the detector shown in FIG. 2, in which the main electrical capacitances are shown which are to be taken into account when using the measuring device, FIG. 4 is a diagrammatic view of the electrical network shown in FIG. 3, FIG. 5 is plan view of a second embodiment of a detector for performing the method according to the invention, FIG. 6 is a longitudinal sectional view of the detector shown in FIG. 5, FIG. 7 shows the main electrical capacitances to be taken into account when using the measuring device provided with the detector shown in FIGS. 5 and 6 in the vicinity of a carrier electrode, and FIG. 8 is a diagrammatic representation of the electrical network shown in FIG. 7.

The detector shown in FIGS. 1 and 2 comprises an insulating plate 10, the side 10a of which is provided with two regions 11 and 12 consisting, for example, of a vapour-deposited layer of conducting material and being insulated with respect to each other. Electrical contact can be established with the regions 11 and 12 via paths 13 and 14 which also consist of a conducting material.

The material of the plate 10 is, for example, polished glass as is commonly used in the thin-layer technique. However, the plate 10 preferably consists of the same material as the substrates on which a layer is deposited by cathode sputtering; this is to prevent measuring errors which may be caused inter alia by the re-emission coefficients which are different for different materials.

The nature of the conducting material forming the regions 11 and 12 and also forming the paths 13 and 14 depends, on the one hand, on the composition of, the thin layer to be studied and, on the other hand, on the gases present in the plasma of the discharge. Use is preferably made of nickel which can be readily passivated in a reactive atmosphere.

The lower side 10b of the detector is preferably arranged on a metal plate 15 which is kept at a constant potential with respect to the mass of the electric generator maintaining the discharge in the sputtering device. This plate is, for example, the carrier electrode on which the substrates are also arranged.

The paths 13 and 14 are connected to connecting wires 16 and 17 which extend outside the space in which the gas discharge takes place. These wires 16 and 17 have an insulating sleeving 18 consisting, for example, of enamel or aluminium oxide, the properties of which are not affected by the discharge. The wire 16 is to be insulated over its entire length within the gas discharge space so as to prevent given portions of the surface of the wire, which are liable to be irregularly covered with a thin layer of the sputtered material, from remaining in contact with the plasma. For this purpose the contact area between the path 13 and the wire 16 and also the naked portion of the wire 16 is protected, for example, by means of a thin layer of aluminium oxide.

Outside the discharge space the wires 16 and 17 are connected to a first voltmeter 19, The wire 16 is furthermore connected, via a second voltmeter 20, to a point which is at a fixed reference potential. In this embodiment this point is formed by the carrier electrode 15. As the carrier electrode is generally connected directly to the ground of the device in cathode sputtering devices, the connection between voltmeter 20 and the carrier electrode imposes no practical problems.

The voltmeters 19 and 20 are direct-voltage instruments. They have to be provided with a suitable filter if the gas discharge is not exclusively maintained by an electric direct current field.

In the space in which cathode sputtering takes place the conducting region 11 is exposed to cathode sputtering with the result that it is covered with a layer 21, while, the conducting region 12 is shielded against the cathode sputtering by a shield 22 (shown in dotted lines in FIG. 1).

The shield 22 is preferably electrically insulated such that the presence of the shield has no actual effect on the potential distribution in the vicinity of the detector. Provided the shield is not made of a magnetic material, it exerts virtually no effect on the gas discharge. In order to simplify the insulation problems, preferably a shield made of glass or a ceramic material is chosen.

Tests with the described device have demonstrated that the dimensions of the elements of this device, in particular the dimensions of the conducting regions 11 and 12, are not critical. Also the shape of the regions 11 and 12 is not important, and the areas of these regions may differ; the layer thickness of the regions is preferably between 100 nm and 500 nm.

The distance between the region 12 and the shield 22 is, for example, between 5 mm and 15 mm, the screen being arranged to be parallel with the plane of the detector (as is the case in FIG. 1). The potential difference between a target plate electrode and the carrier electrode of the cathode sputtering device lies between 1,500 and 4,000 volts at a mutual distance of 35 to 60 mm between these electrodes.

The method of measuring the thickness of a thin layer of dielectric material by means of the measuring device set forth will be described hereinafter with reference to FIGS. 3 and 4.

FIG. 3 shows that the system formed by the conducting region 11, the dielectric layer 21 (having a thickness $x$ and a dielectric constant E) and the uncovered conducting region 12 forms a first capacitor $C_x$, the layer 21 being electrically connected to the region 12 via the surrounding plasma since the latter is electrically conducting.

The capacitor $C_x$ forms a network in conjunction with various other capacitors. The most important of these other capacitors are the capacitor $C_1$, which is connected in parallel with capacitor $C_x$ and whose dielectric is formed by the material of the plate 10, the capacitor $C_2$ (the electrodes of which are formed by the region 11 and the wire 16 on the one side, and the plate 15 on the other side), and the capacitor $C_3$ (whose electrodes are formed by the region 12 and the wire 17 on the one side, and the plate 15 on the other side).

The network formed by the said capacitors is schematically shown in FIG. 4. The problems of the determination of the thickness $x$ of the thin layer 21 can be reduced to the determination of the thickness of the dielectric of the flat capacitor $C_x$.

We will consider the two capacitors $C_x$ and $C_2$ (capacitor $C_1$ may be neglected due to its comparatively small capacitance with respect to capacitor $C_x$). A potential difference $|V_F-V_S|$ is present across the capacitor $C_x$, $V_S$ being the potential of the conducting region 11 covered with the layer 21, $V_F$ being the floating potential of the conducting region 12 which is in contact with the plasma. (Any insulated surface which is present in the plasma. of a gas discharge is known to assume a given electrical potential, which is called floating potential. Both the surface of the layer 21 bordering the plasma and the conducting region 12 have this floatng potential.). The voltmeter 19 measures the value $|V_F-V_S|$.

Present across the capacitor $C_2$ is a potential difference $|V_S-V_0|$, $V_0$ being the fixed reference potential, in this case the potential of the carrier electrode 15. The volmeter 20 measures the value $|V_S-V_0|$.

As the capacitors $C_x$ and $C_2$ are connected in series:

$$C_x \cdot |V_F-V_S| = C_2 \cdot |V_S-V_0|,$$

so $C_x = C_2 \cdot |V_S-V_0|/|V_F-V_s|$.

If the capacitor $C_x$ is assumed to be equal to a flat capacitor whose electrode surface is equal to S, moreover:

$$C_x = (1/4\,\pi) \cdot (\epsilon/x) \cdot S = C_2 \cdot |V_s-V_0|/|V_F-V_S|,$$

so:

$\epsilon/x = k \cdot |V_S-V_0|/|V_F-V_S| \cdot$ (where $k = C_2 \cdot 4\,\pi/s$).

In reality the expression for the constant $k$ is more complex than appears from the above formula. The value of $k$ depends on the values of the various capacitances present, and these values again may be dependent inter alia of the geometry of the mutual positions and of the physical properties of the constituent elements of the measuring device. It is possible to influence some of the said factors in order to change the sensitivity of the device.

In order to enable direct calculation of the value $x$ from the measuring results $|V_F - V_S|$ and $|V_S - V_0|$, the detector is pre-calibrated. To this end a thin layer of dielectric material is formed on the region 11 of the detector, the detector being placed in its operating position in the cathode sputtering space, and the values $|V_F-V_{s_1}|$ and $|V_{s_1}-V_0|$ are measured at the instant that the discharge is switched off. Subsequently, the thickness $x_1$ of the formed thin layer of material is measured according to a known measuring method. This single test is sufficient for calibration. During the later formation of the thin layer whose thickness is to be measured, each time the two associated values $|V_F-V_S|$ and $|V_S-V_0|$ are measured, enabling determination of the layer thickness by comparison with the values $|V_F-V_{s_1}|$ and $|V_s-V_0|$. Using the formula deduced above for $\epsilon/x$ 1:

(1) $\epsilon/x_1 = k \cdot |V_s -V_0|/|V_F V_S|$   (calibration)
(2) $\epsilon/x_2 = k \cdot |V_S -V_0|/|V_F-V_S|$   (measurement)

Division of expression (1) by expression (2) gives:

$$x_2/X_1 = |V_S -V_0|/|V_S -V_0| \cdot |V_F-V_S|/|V_F-V_S|,$$

so:

$$X_2 = X_1 \cdot |V_S -V_0|/|V_S -V_0| \cdot |V_F-V_S|/|V_F-V_S|.$$

The values of $x_3, x_4 ... x_n$ can thus be derived from the successive measurements of the values $|V_F-V_S|$ and $|V_S-V_0|$.

The value and the polarity of each of the potentials $V_F$, $V_S$ and $V_O$ depend on the polarity of the electrodes which are deoendent again of how the gas discharge is maintained (for example, with alternating voltage, modulated voltage, etc.) This is the reason why absolute values have to be used for $|V_F V_S|$ and $|V_S-V_0|$ It is to be noted that the potential difference across the capacitor $C_3$ constantly remains equal to $V_F-V_O$; consequently, in the calculation performed above the capacitor $C_3$ need not be taken into account, According to the second embodiment of a detector for performing the method according to the invention, the detector again consists of an insulating plate 10 on which two conducting regions 11 and 12 are provided. In this case the region 11 is situated, however, on one side, and the region 12 is situated on the other side of the plate 10 (see FIGS. 5 and 6). In these Figures the region 12 is narrower than the region 11, but this distinction is not a prerequisite.

The detector is preferably arranged in the vicinity of the carrier electrode 15 carrying the substrates to be covered, and in a plane which is approximately parallel to the said electrode. The region 11 is thus directed towards the discharge space of the cathode sputtering device so that this region is gradually covered with a thin layer whose thickness is equal to that of the layer covering the neighbouring substrates, whilst the region 12 which is shielded by the plate 10 (now serving as a shield remains uncovered.

Even though the detector has a different appearance, all elements of the measuring device are analogous to those of the device described with reference to FIGS. 1 and 2. For the sake of clarity the same reference numerals are used.

A detector as shown in the FIGS. 5 and 6 may not be arranged on the carrier electrode 15 as the conducting region 12 would then be in contact with this electrode. Consequently, the detector is arranged, for example, on a rigid carrier (not shown) which itself is mounted on the carrier electrode.

The detector is preferably arranged as near as possible to the carrier electrode, at least in the immediate vicinity of the substrates on which the thin layer is formed. The distance between the detector and the carrier electrode is preferably between 5 mm and 10 mm.

In FIG. 7, in complete analogy with FIG. 3, the capacitances $C_x, C_1, C_2$ and $C_3$ are shown. The electrical diagram shown in FIG. 8, which follows from FIG. 7, is also identical to the electrical diagram shown in FIG. 4, which itself is based on the detector shown in FIG. 3.

The calculation developed for the detector of the first type can, consequently, be performed in the same way for the detector of the second type; in both cases the same formulas are found for determining the thickness $x$.

The value of the constant $k$ can also be influenced in the case of a detector of the second type, which enables adaptation of the sensitivity of the measuring device.

What is claimed is:

1. A method of determining the thickness of a thin layer of dielectric material during deposition, by means of cathode sputtering, of this layer on substrates which are provided on a carrier electrode in a space in which a gas discharge is maintained such that the space is at least partly filled with a plasma, characterized in that in the vicinity of the carrier electrode and in a plane which is approximately parallel to the carrier electrode a detector is arranged in the plasma, the detector consisting of an insulating plate comprising two conducting regions, the first region of which is exposed to the cathode sputtering, the second region being shielded therefrom, potential differences being measured between the two said regions mutually and between the first region and a reference potential.

2. A method as claimed in claim 1, characterized in that the reference potential is the potential of the carrier electrode.

* * * * *

UNITED STATES PATENT OFFICE
CERTIFICATE OF CORRECTION

Patent No. 3,775,277  Dated November 27, 1973

Inventor(s) Jean Pompei et al.

It is certified that error appears in the above-identified patent and that said Letters Patent are hereby corrected as shown below:

Column 5, line 20, after "plasma" cancel "."

Column 6, line 1, "$|V_s - V_o| \; 1 \; |V_F \; V_s|$" should read -- $|V_{s_1} - V_o| \; 1 \; |V_F - V_{s_1}|$ --; line 2, "$|V_s - V_o| \; 1 \; |V_F - V_s|$" should read -- $|V_{s_1} - V_o| \; 1 \; |V_F - V_{s_2}|$ --; same column 6, lines 5 and 8, "$|V_s - V_o|/|V_s \; V_o|/|V_f - V_s|/|V_f - V_s|$" should read -- $|V_{s_1} - V_o|/|V_{s_2} - V_o|/|V_f - V_{s_2}|/|V_f - V_{s_1}|$ --; line 17, "$|V_F V_s|$" should read -- $|V_F - V_s|$ --; line 42, after "shield" insert -- ) --.

Signed and sealed this 20th day of August 1974.

(SEAL)
Attest:

McCOY M. GIBSON, JR.
Attesting Officer

C. MARSHALL DANN
Commissioner of Patents